June 6, 1939. E. J. STAHLHAMMER 2,161,265
THREADING SPINDLE
Filed Aug. 25, 1937 2 Sheets-Sheet 2

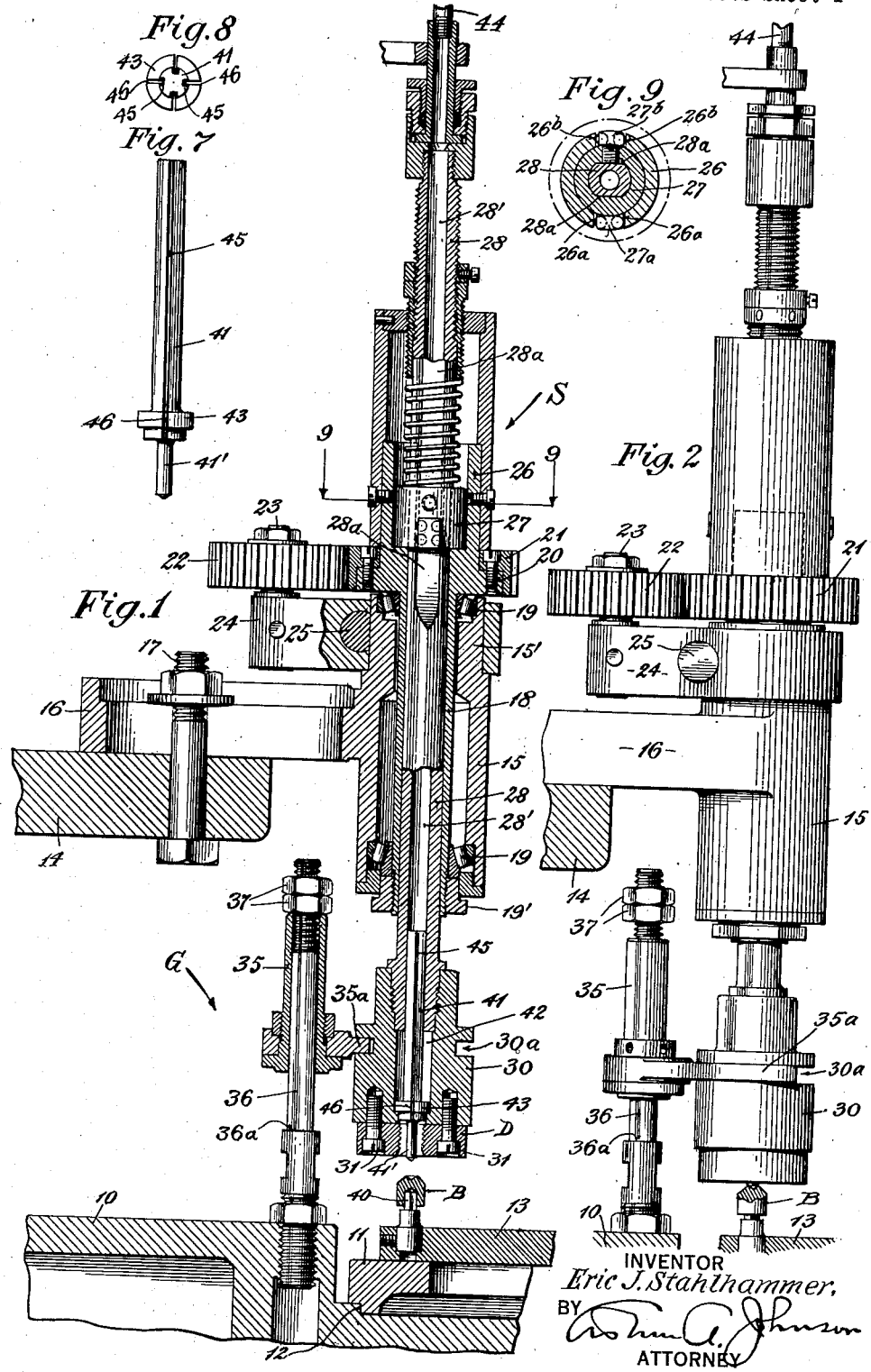

INVENTOR
Eric J. Stahlhammer
BY
ATTORNEY

Patented June 6, 1939

2,161,265

UNITED STATES PATENT OFFICE 2,161,265

THREADING SPINDLE

Eric J. Stahlhammer, Bridgeport, Conn., assignor to The Bodine Corporation, Bridgeport, Conn., a corporation of Connecticut Application August 25, 1937, Serial No. 160,828

14 Claims. (Cl. 10—107)

This invention relates to screw-threading machines, particularly to that class thereof which will cut external threads on small workpieces which cannot be grasped or clamped in chucks and held therein during the threading operation.

For instance, it has always been a difficult problem to cut true and full length screw threads on the outer surface of cylindrical blanks, especially of smaller sizes, like those of the so-called "Allen headless set screws", because there is no way in which these blanks can be externally chucked, the threading tool traversing the entire length of the blank's outer surface. Consequently the only expedient heretofore resorted to, was to place the blank onto an arbor whose shape and size correspond at least approximately to the recess (formed usually square, sometimes triangular) extending into one end of the blank for the normal purpose of receiving the squared or triangular shank of a wrench tool to drive the finished screw into a tapped hole prepared for it, or vice versa, to extract it therefrom.

However, inasmuch as the drive recesses in the screw ends are usually drop forged, and are not deep enough to line up the blank with the arbor on which it sits, the blank is apt to wobble on the arbor and cause the exteriorly cut thread to be more or less distorted from its required true axial alignment.

In order to avoid this objection, the present invention provides means whereby the blank will be held in true axial position during the period when the die chasers of the machine are doing the thread cutting, and also when they are reversely operated to leave the newly-threaded blank free to be removed from its arbor.

In the present instance, the invention is shown as being incorporated in a vertical type of machine, that is to say that type in which the threading spindles, which may consist of one or more, are movable vertically to do their work on blanks which latter are positioned on arbors located on a horizontal table turntable on a vertical axis to bring successive blanks into alignment with the spindles, respectively, the table however having no vertical movement. Of course, it should be understood that the invention, as such, is applicable to other types of machines, as well. Each blank is placed on its arbor (carried by the table), so as to have its lower forged wrench-recess seated on the arbor, while its upper conical and usually countersunk end is brought into vertical alignment with the spindle which is to do the thread cutting. When in this position, the upper blank end will be engaged by a plunger whose lower end is adapted to seat itself in the countersunk top portion of the blank and thus hold the latter in fixed position at the top while the arbor holds the lower recessed end, both ends being then in central vertical alignment.

The plunger just referred to is vertically movable in the spindle and is, in the present instance, forced downward by force of oil pressure introduced into the upper end of the spindle, the latter constituting a cylinder in which the plunger can move in a manner similar to that of a piston, but which becomes stationary when its lower end engages the upper countersunk end of the blank, without, however, interfering with the vertical downward movement of the spindle which carries the chasers.

In accordance with the present invention, a portion of this pressure oil is permitted to pass to the bottom end of the plunger, the latter having one or more small longitudinal surface grooves which permit the passage of a small amount of oil therethrough, so that this leakage oil becomes usable as a lubricant or cutting oil for the threading chasers, a feature which is important in practice and is here entirely automatic in action.

As above stated, in the present machine the work-supporting table does not move vertically; but the threading spindles are carried by a slide which is moved vertically during the thread-cutting operation in the usual manner, and so that the descending movement per revolution of the spindles is more than the downward travel or pitch of the chasers. In other words, the spindle consists really of two telescopic lengths, the outer one moving with the machine slide, the inner one carrying the cutting chasers and therefore being limited in its vertical movement as dependent upon the chaser pitch, which is less than the vertical longitudinal movement prescribed for the outer spindle section. To permit this greater movement of the outer spindle section, a spring is interposed between the two sections and will be compressed when the outer section descends faster than the inner chaser section.

Other objects of the invention will hereinafter appear.

Referring to the drawings:

Figure 1 is a central vertical section of the complete threading spindle assemblage as secured to the vertically movable slide of the machine, and shows also a portion of the revoluble work-supporting table in position on the knee of the machine, together with the stop device for limiting the downward threading movement of the chasers to a predetermined depth.

Fig. 2 is a side elevation corresponding to Fig. 1.

Figure 3:
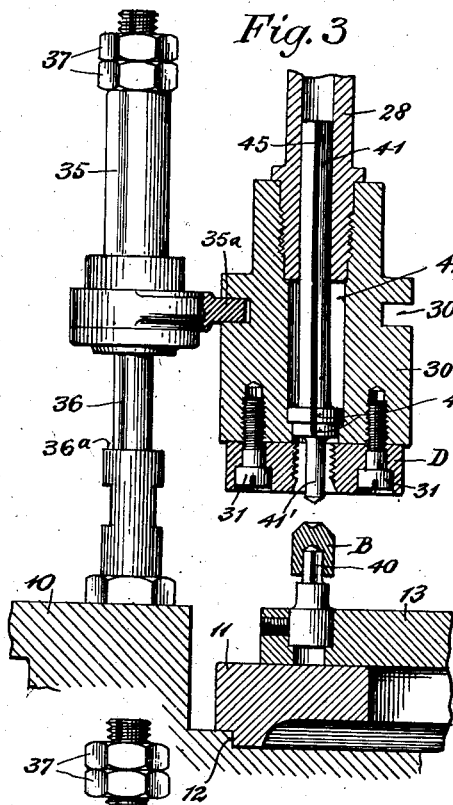
Figure 4:
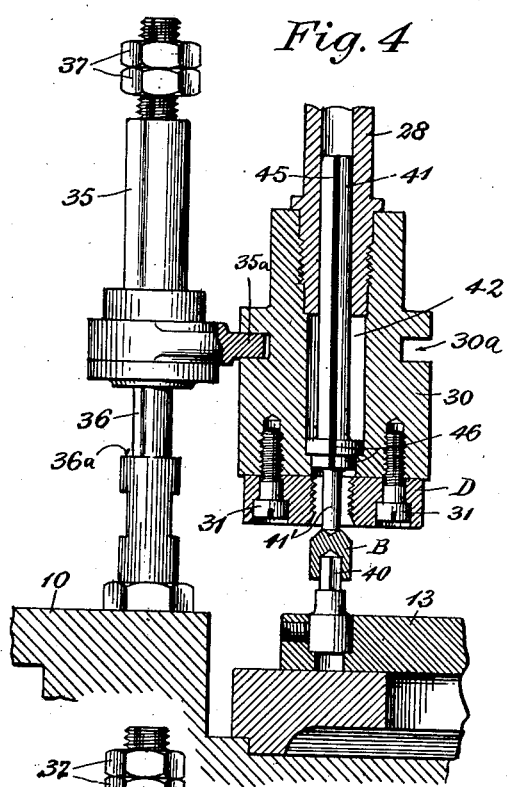
Figure 5:
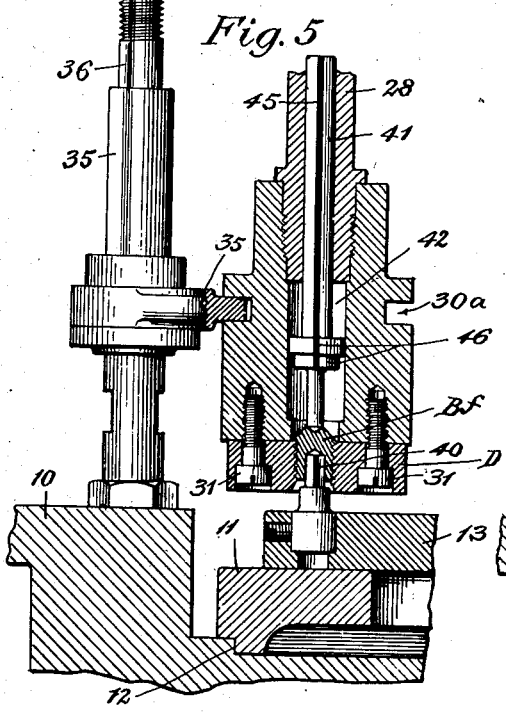
Figure 6:
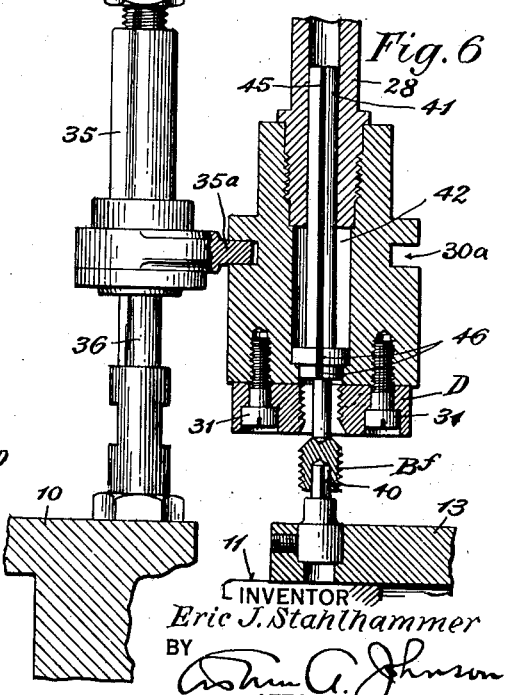

Figs. 3, 4, 5 and 6 show different progressive positions of the chasers relative to the work, Fig. 3 being the initial condition of the parts. Fig. 4 shows the blank held in place on its arbor, and spindle lowered to almost bring the chasers into contact with the blank. Fig. 5 illustrates the chasers after they have completed their work of externally threading the full length of the blank and are ready to move upward again, upon reversal of the spindle rotation. Fig. 6 shows the spindle raised again to have the chasers clear of the now threaded blank, and the down-holding plunger still in action.

Fig. 7 is a side view of the oil-actuated down-holding plunger, per se.

Fig. 8 is a top view thereof.

Fig. 9 is a horizontal section, on line 9—9, of Fig. 1.

Inasmuch as the type of machine, to which the subject matter of the present invention has been exemplarily applied, is well known in the art, the drawings show fractionally only such parts thereof as may be required for a better understanding of the functions which the new parts are to perform. In Fig. 1, the numeral 10 denotes a portion of the machine knee, which is usually vertically adjustable only, to accommodate workpieces of different heights. This otherwise stationary knee carries a work-supporting table 11 rotatable in a circular recess 12 and on a vertical axis on the knee and provided with individual work supports 13 which are securely clamped thereto.

The upper part of the machine has the usual main slide 14, which is vertically movable, either manually or automatically, to bring the tool spindles into or out of engagement with the work on the knee table 11. The tool spindles S (of which there may be several) are each supported for vertical rotation in a barrel bearing 15 having the usual slotted tailpiece 16 to permit the spindle to be properly positioned on the slide 14 and clamped there by a bolt 17. The spindle consists of a pair of telescopically arranged parts, the outer tubular section 18 being journaled but not slidable in the barrel bearing 15, suitable roller bearings 19 being provided to insure a close running fit between these parts. At its lower end the tube 18 has a nut 19' which not only permits a close adjustment of the lower roller bearing 19 but also prevents upward movement of the tube 18 in the barrel 15. In a similar manner, downward movement of the spindle tube 18 is prevented by an annular flange 20 to which the spindle-driving pinion 21 is secured by screws, as shown in Fig. 1. Power is transmitted to the pinion 21 by an intermediate gear 22 which is journaled on a stud 23 carried by a sweep 24, supported on the upper portion 15' of the barrel 15 and adapted to be swung around the same to bring the intermediate gear 22 into proper engagement with whatever central main gear the machine is equipped with, for obtaining various speeds as required, the sweep 24 being then fixed on the barrel by a wedge pin 25, as usual.

Above the upper spindle flange 20, the spindle tube 18 is provided with a tubular extension 26 to receive a driving head 27 whereby the inner or tool spindle 28 is indirectly rotated by the pinion, the driving connection being as follows: The tubular extension 26 (see Fig. 9) is longitudinally slotted at diametrically opposite portions of its shell to form pairs of parallel contact faces 26a, 26b in which side wings 27a, 27b, projecting from the head 27 are positioned for connecting the tool spindle extension 26 with the head 27, so that, when the extension pinion 21 is driven, the head 27 and the tubular spindle portion 18 will also be rotated, by way of the head wings 27a, 27b, contacting the faces 26a, 26b, respectively. Broadly speaking, the spindle tube 18 is, in reality, only a driver for the actual tool-carrying spindle 28, the tool in the present instance being shown as a solid chaser die D secured to the lower face of a tool block 30 by screws 31 which permit substitution of various sizes of dies for the one in use. The block 30 has preferably a pipe-thread connection with the lower end 32 of the inner tool spindle 28 which consisted heretofore of a solid rod vertically movable in the spindle tube, but which in the present invention incorporates some new features to be described hereinafter.

Considering the tool spindle 28 in connection with its driving mechanism, its upper portion (above the sweep 24) has two opposite sides flatted, as at 28a, to fit a correspondingly shaped slot provided for it in the head 27, these flatted sides constituting a sliding key-connection between the spindle 28 and head 27, the latter being longitudinally adjustable on the tube to control the limit of downward movement which the tool may attain relative to the outer tubular spindle 18, it being evident that, unless the machine slide 14 moves downward, the tool spindle cannot descend any farther. On the other hand, if the slide 14 does descend, the tool spindle 28 will go down with it until it is stopped by a depth gage G, shown herein as a vertically movable slide 35 comprising a fork 35a which straddles an annular groove 30a in the tool block 30, and is supported on a vertical rod 36 secured to the machine knee 10, as shown. The downward movement of the forked slide 35a is limited by a shoulder 36a of the rod 36, the latter being adjustable in the knee 10.

In machines, where the machine slide 14 is vertically operated by hand, the upward movement of the tool spindle may also be controlled by check nuts 37 secured to the upper end of the depth rod 36, as will be readily understood.

An important feature of the present invention is the provision of pressure-actuated means for firmly holding the upper end of the blank when the latter is seated on the work support, and herein shown as a headless cylindrical blank B recessed in its lower end to substantially fit the polygonal arbor end 40 of the work-supporting member on the table 11, and countersunk at its upper end, there to be engaged by the lower end of a holding device illustrated as the end portion 41' of a plunger 41 of such diametrical size that ample clearance space is provided between it and the thread-cutting faces of the die head D. The block 30 is bored to constitute a cylinder 42; while the plunger 41 has a flange 43 which constitutes a piston having a sliding fit in the cylindrical bore 42, the plunger 41 acting as a piston rod guided in the tubular interior 28' of the spindle 28, so that, when pressure is applied against the upper end of the rod 41, the latter will be forced downward until its extreme lower end 41' is firmly seated within the countersunk recess of the blank, which thus is rigidly held in position on the arbor 40. Inasmuch as this downward movement of the plunger depends upon the downward movement of the block 30, for the reason that the piston 43 acts as a limiting stop for the plunger movement through the block, the end 41' will not engage the blank until the block 30 has been moved downwardly sufficiently to nearly bring the cutting chasers of the die D into engagement with the blank, it being understood, however, that the blank is firmly held by the plunger, before the chasers actually begin their work. See Figs. 3 and 4.

Reversely, when the block 30 is raised, the threaded blank Bf will not be released until the chasers are clear of the same. See Figs. 5 and 6.

The pressure-producing means consists, in accordance with the present invention, of a body of oil which is forced into the top of the interior 28' of the tubular spindle 28 through a supply pipe 44 (see Fig. 1). Any suitable mechanism may be employed for connecting the oil supply pipe 44 with the top of the spindle, so as to permit rotation of the latter; while the pipe 44 is not rotatable but may move up and down with the spindle.

Again referring to the plunger 41 above described, there are provided on the outer surface of the rod one or more longitudinal grooves 45 which permit pressure oil to pass from above the rod into the cylindrical chamber 42 where it becomes effective directly against the piston 43 and therefore exerts a substantially increased downward pressure on the rod or plunger 41. Furthermore, the piston 43, itself, is also provided with at least one groove 46, permitting oil to pass directly onto the blank below it, so that in this manner the chasers are supplied with the required lubricating medium or cutting oil in an entirely automatic manner, as long as oil is forced into the upper end of the spindle 18.

Variations and modifications may be made within the scope of this invention and portions of the improvements may be used without others.

I claim:

1. In a screw-threading machine for threading small headless blanks, means for supporting a blank at one of its ends; a die spindle having a threading die thereon movable into threading relation with the blank; and a fluid-operated plunger carried by the spindle and adapted to engage and rigidly hold the blank on the support during the threading operation.

2. In a screw-threading machine for threading small headless blanks, means for supporting a blank at one of its ends; a die spindle having a threading die thereon movable toward and away from the work-supporting means and into threading relation with the blank; and a fluid-operated member carried by the spindle and adapted to engage the free end of the blank before the threading die to rigidly hold the same during the threading operation, said member being relatively movable with respect to the spindle against the pressure of the fluid to permit the threading die to operate on the blank while the same is held in position by said member.

3. In a screw-threading machine, means for supporting the workpiece at one of its ends; a die spindle having a threading die thereon movable toward and away from the work-supporting means and into threading relation with the workpiece; a fluid-operated member carried by the spindle and adapted to engage the workpiece before the threading dies to hold the same during the threading operation, said member being relatively movable with respect to the spindle against the pressure of the fluid to permit the threading die to operate on the workpiece while the same is held in position by said member and also operative to hold the workpiece until after the threading die has been withdrawn from the same; and means for by-passing a portion of said operating fluid around said member to lubricate the workpiece during the threading operation.

4. In a device for externally threading a workpiece, means for supporting the workpiece internally of the same at one of its ends; and a die spindle movable into operative relation with said workpiece and having a relatively movable fluid-operated member adapted to engage the other end of the workpiece to clamp it to the support during the threading operation, said fluid-operated member having channels formed therein to divert a portion of the fluid and direct the same to the workpiece whereby the workpiece is lubricated and cooled during the threading operation.

5. In a device for externally threading a workpiece, means for supporting the workpiece internally of the same at one of its ends; and a tubular die spindle movable into operative relation with said workpiece and having a coaxially disposed fluid-operated member mounted for movement therein adapted to engage the other end of the workpiece to clamp it to the support during the threading operation, said member being constructed and arranged to engage the workpiece before the threading operation is initiated.

6. In a screw-threading machine for cutting threads on small headless blanks, means for supporting a blank at one of its ends; a spindle having threading elements thereon mounted for movement toward and away from the blank; and means carried by the spindle for engaging the other end of the blank and rigidly holding and steadying the same during movement of the threading elements along the blank.

7. In a screw-threading machine for cutting threads on small headless blanks, means for supporting a blank at one of its ends so that it extends upwardly from the support; a spindle movable into operative relation with the blank and having a threading die thereon; a piston operable in a bore in the spindle and having a projecting portion adapted to engage the upper end of the blank and to rigidly hold the same during the threading operation; and means for supplying a fluid under pressure to the bore of the spindle to move the piston and its associated elements into contact with the blank prior to the initiation of the threading operation.

8. In a screw-threading machine, means for supporting a workpiece at one of its ends so that it extends outwardly from the support; a spindle movable into operative relation therewith and having a threading die thereon; a piston operable in a bore in the spindle and having an integral projection thereon adapted to engage the other end of the workpiece, said projection rigidly engaging said workpiece; and means for supplying a fluid to the bore of the spindle to move the projection into contact with the workpiece prior to the initiation of the threading operation, said fluid also holding the projection in contact with the workpiece during removal of the threading die from the same.

9. In a screw-threading machine, means for supporting a workpiece at one of its ends so that it extends outwardly from the support; a spindle movable into operative relation therewith and having a threading die thereon; a piston operable in a bore in the spindle and having a projection thereon adapted to engage the other end of the workpiece and to rigidly hold the same during the threading operation; and means for supplying a fluid to the bore of the spindle to move the projection into contact with the workpiece prior to the initiation of the threading operation, the piston moving relative to the spindle against the pressure of the fluid during the threading operation.

10. In a screw-threading machine for cutting threads on small headless blanks, means for supporting a blank at one of its ends; a spindle having a threading die thereon movable into operative relation with said blank; and coaxial means mounted for movement on the spindle and associated with the die for holding the blank to the support and also for supplying a lubricant to the blank and die during the threading operation, said means being adapted to engage the blank prior to the initiation of the threading operation and rigidly hold the same to its supporting means.

11. In a screw-threading machine, means for supporting a workpiece at one of its ends so that it extends outwardly from the support; a spindle movable into operative relation therewith and having a threading die thereon; a piston operable in a bore in the spindle and having a projection thereon adapted to engage the other end of the workpiece; and means for supplying a fluid to the bore of the spindle to move the projection into contact with the workpiece, said piston being provided with passages extending along its length whereby the fluid under pressure may pass through the piston and onto the workpiece to cool and lubricate the same during the threading operation.

12. In a screw-threading machine, an arbor for supporting the workpiece at one of its ends; a driven spindle tube; means for driving said tube; a spindle mounted in said tube for movement therewith; a tool block having a cylinder therein secured to the spindle adjacent said workpiece; a plunger operable in a bore of the tool spindle having a piston formed thereon adapted to slide in the cylinder of said tool block; a projection carried by said piston; means for moving said spindle and cutter tool into operative relation with said workpiece; and means for supplying a fluid under pressure to the bore of the spindle to move the piston so that the projection contacts and clamps the workpiece prior to the threading operation.

13. In a screw-threading machine, an arbor for supporting the workpiece at one of its ends; a driven spindle tube; means for driving said tube; a spindle mounted in said tube for movement therewith; a tool block having a cylinder therein secured to the spindle adjacent said workpiece; a plunger operable in a bore of the tool spindle having a piston formed thereon adapted to slide in the cylinder of said tool block; a projection carried by said piston; means for moving said spindle and cutter tool into operative relation with said workpiece; and means for supplying a fluid under pressure to the bore of the spindle to move the piston so that the projection contacts and clamps the workpiece prior to the threading operation, said piston being provided with passages extending along its length whereby the fluid under pressure may pass through the piston and onto the workpiece to cool and lubricate the same during the threading operation.

14. In a screw-threading machine, an arbor for supporting a workpiece at one of its ends so that it extends upwardly from the support; a tool spindle including a tool block with a threading die mounted thereon; means for moving said threading die into operative relation with said workpiece; a plunger operable in a bore of the spindle having a piston formed thereon; a cylinder in said tool block coaxially disposed with the bore of said spindle, said piston adapted to be mounted for reciprocal movement in the cylinder of said tool block; a projection carried by said piston; means for supplying a fluid to the bore of the spindle to move the projection into contact with the workpiece prior to the initiation to the threading operation, said fluid also holding the projection in contact with the workpiece during the removal of the threading die from the same; and passages formed in the plunger and cylinder to divert a portion of the fluid and direct the same to the workpiece whereby the workpiece is lubricated and cooled during the threading operation.

ERIC J. STAHLHAMMER.